United States Patent
Zhan et al.

(10) Patent No.: US 9,432,852 B2
(45) Date of Patent: Aug. 30, 2016

(54) APPARATUS AND METHODS FOR RADIO FREQUENCY SIGNAL BOOSTERS FOR CELLULAR AND BROADCAST TELEVISION SIGNALS WITH WI-FI SIGNALS TRANSMISSION FUNCTION

(71) Applicant: CELLPHONE-MATE, INC., Fremont, CA (US)

(72) Inventors: Hongtao Zhan, Fremont, CA (US); Derong Lu, Shenzhen (CN)

(73) Assignee: CELLPHONE-MATE, INC., Fremont, CA (US)

( * ) Notice: Subject to any disclaimer, the term of this patent is extended or adjusted under 35 U.S.C. 154(b) by 0 days.

(21) Appl. No.: 14/863,771

(22) Filed: Sep. 24, 2015

(65) Prior Publication Data

US 2016/0095002 A1   Mar. 31, 2016

Related U.S. Application Data

(60) Provisional application No. 62/056,344, filed on Sep. 26, 2014.

(51) Int. Cl.

| | |
|---|---|
| G01R 31/08 | (2006.01) |
| H04W 16/26 | (2009.01) |
| H04L 5/14 | (2006.01) |
| H04B 1/00 | (2006.01) |
| H04B 1/38 | (2015.01) |
| H04B 1/40 | (2015.01) |
| H04B 7/155 | (2006.01) |

(52) U.S. Cl.
CPC ............ *H04W 16/26* (2013.01); *H04B 1/005* (2013.01); *H04B 1/38* (2013.01); *H04B 1/40* (2013.01); *H04B 7/155* (2013.01); *H04L 5/14* (2013.01)

(58) Field of Classification Search
CPC .................................................... H04W 72/04
USPC .................................. 370/252–253, 328–339
See application file for complete search history.

(56) References Cited

U.S. PATENT DOCUMENTS

| | | | |
|---|---|---|---|
| 6,570,858 B1 | 5/2003 | Emmons et al. | |
| 7,706,308 B2 * | 4/2010 | Yun | H04W 76/802 370/280 |
| 7,729,656 B2 | 6/2010 | Van Buren | |

(Continued)

OTHER PUBLICATIONS

Representative FCC Approval Documents (FCC Identifier RSNWF-HD) for Applicant Name Cellphone-Mate, made public Jul. 29, 2015, in 13 pages (available at World Wide Web page: transition.fcc.gov/oet/ea/fccid/).

(Continued)

*Primary Examiner* — Iqbal Zaidi
(74) *Attorney, Agent, or Firm* — Knobbe, Martens, Olson & Bear, LLP

(57) ABSTRACT

Provided herein are apparatus and methods for radio frequency signal boosters for cellular and broadcast television signals with Wi-Fi signals transmission function. Cell phone, Wi-Fi, and broadcast television signals are boosted and retransmitted over a shared antenna or over more than one antenna. In certain implementations, a multi-band signal booster is configured to provide signal path gain to at least three signal paths: a first signal path configured to receive a first time division duplexed Wi-Fi signal, a second signal path configured to receive a first frequency division duplexed mobile or cellular signal, and a second signal path configured to receive a broadcast television signal.

26 Claims, 7 Drawing Sheets

(56) References Cited

U.S. PATENT DOCUMENTS

| | | | |
|---|---|---|---|
| 7,783,318 B2 | 8/2010 | Wilson et al. | |
| 8,867,572 B1 | 10/2014 | Zhan | |
| 9,100,839 B2 | 8/2015 | Zhan | |
| 2002/0105935 A1* | 8/2002 | Miya | H04B 7/26 370/342 |
| 2005/0227652 A1 | 10/2005 | Kang et al. | |
| 2007/0071128 A1 | 3/2007 | Meir et al. | |
| 2008/0069062 A1* | 3/2008 | Li | H04W 52/265 370/338 |
| 2008/0233865 A1 | 9/2008 | Malarky et al. | |
| 2010/0202325 A1 | 8/2010 | Poulin et al. | |
| 2012/0302188 A1 | 11/2012 | Sahota et al. | |
| 2014/0016525 A1 | 1/2014 | Yoshizawa | |
| 2014/0038531 A1 | 2/2014 | Hayafuji et al. | |
| 2014/0292593 A1 | 10/2014 | Thiam et al. | |

OTHER PUBLICATIONS

SureCall Force-7 Industrial User Guide, Made Public Jul. 29, 2015, in 26 pages (available at World Wide Web page: transition.fcc.gov/oet/ea/fccid/).

CKC Laboratories, Inc., Radio Frequency Exposure Report, Report No. 96950-22, Issue Jun. 6, 2015, made public Jul. 29, 2015 in 9 pages (available at World Wide Web page: transition.fcc.gov/oet/ea/fccid/).

CKC Laboratories, Inc., Addendum EMC Test Report, Report No. 96950-13A, Issue Jul. 14, 2015, made public Jul. 29, 2015 in 217 pages (available at World Wide Web page: transition.fcc.gov/oet/ea/fccid/).

CKC Laboratories, Inc., EMC Test Report, Report No. 96950-14, Issue Jul. 6, 2015, made public Jul. 29, 2015 in 93 pages (available at World Wide Web page: transition.fcc.gov/oet/ea/fccid/).

CKC Laboratories, Inc., EMC Test Report, Report No. 96950-15, Issue Jul. 6, 2015, made public Jul. 29, 2015 in 70 pages (available at World Wide Web page: transition.fcc.gov/oet/ea/fccid/).

CKC Laboratories, Inc., EMC Test Report, Report No. 96950-16, Part 1, Issue Jul. 6, 2015, made public Jul. 29, 2015 in 115 pages (available at World Wide Web page: transition.fcc.gov/oet/ea/fccid/).

CKC Laboratories, Inc., EMC Test Report, Report No. 96950-16, Part 2, Issue Jul. 6, 2015, made public Jul. 29, 2015 in 86 pages (available at World Wide Web page: transition.fcc.gov/oet/ea/fccid/).

PCT/US2015/051918 PCT International Search Report and Written Opinion, Mailed on Dec. 23, 2015 in 11 pages.

Cellphone-Mate Force-5 Manual, Apr. 30, 2012, in 36 pages (available at World Wide Web page: transition.fcc.gov/oet/ea/fccid/).

Wilson Sleek 4G Signal Booster Installation Guide, Dec. 4, 2012, in 8 pages (available at World Wide Web page wilsonelectronics.com).

Wilson AG ProTM Quint Selectable Signal Booster Installation Guide, Sep. 12, 2012 in 16 pages (available at World Wide Web page wilsonelectronics.com).

* cited by examiner

APPARATUS AND METHODS FOR RADIO FREQUENCY SIGNAL BOOSTERS FOR CELLULAR AND BROADCAST TELEVISION SIGNALS WITH WI-FI SIGNALS TRANSMISSION FUNCTION

CROSS-REFERENCE TO RELATED APPLICATIONS

The present application claims priority to U.S. Provisional Patent Application No. 62/056,344, filed Sep. 26, 2014, titled "APPARATUS AND METHODS FOR RADIO FREQUENCY SIGNAL BOOSTERS FOR CELL PHONE, WIFI, AND BROADCAST TELEVISION SIGNALS," the entirety of which is hereby incorporated herein by reference.

FIELD

Embodiments of the invention relate to electronic systems and, in particular, to radio frequency (RF) signal boosters.

BACKGROUND

A cellular or mobile network can include base stations for communicating with wireless devices located within the network's cells. For example, the base stations can transmit signals to wireless devices via a downlink channel and can receive signals from the wireless devices via an uplink channel.

A Wi-Fi network can include several access points for communicating with close proximity Wi-Fi enabled devices such as laptops and smartphones. For example, a Wi-Fi access point can transmit signals via a Wi-Fi downlink channel to Wi-Fi enabled devices, such as computers or smartphones, and can receive Wi-Fi signals via a Wi-Fi uplink channel.

Broadcast television transmission refers to the transmission of radio frequency television channels within designated frequency bands by a television transmitter. The transmitted signal is captured by a television antenna, and channels are tuned by a television receiver.

SUMMARY

In one embodiment, a radio frequency signal booster includes a time division duplex (TDD) circuit and a frequency division duplex (FDD) circuit. The TDD circuit is configured to amplify, pass, or process an uplink signal in a first frequency band, and to amplify or pass or process a downlink signal in the first frequency band. The uplink and downlink signals of the first frequency band form a TDD pair. The FDD circuit is configured to amplify an uplink signal in an uplink portion of a second frequency band, and to amplify a downlink signal in a downlink portion of the second frequency band. The uplink and downlink signals of the second frequency band form an FDD pair. The radio frequency signal booster can comprise a wireless router that includes the TDD circuit; the wireless router can be configured to establish a cellular data connection via an antenna, and to provide Wi-Fi connectivity for the cellular data connection via the TDD circuit. One of the following can be shared by both the TDD circuit and the FDD circuit: a direct current power supply, an alternating current power supply, a housing, a printed circuit board, one or more diplexers, one or more radio frequency connectors, a control circuit or processor, radio frequency shielding, internal radio frequency cabling, an amplifier, a duplexer, a multiplexer or radio frequency signal path, and a heat sink.

In another embodiment, a radio frequency signal booster comprises an amplifier path and a frequency division duplex (FDD) circuit. The amplifier path is configured to amplify, pass, or process a broadcast television band signal in a first frequency band. The frequency division duplex (FDD) circuit is configured to amplify an uplink signal in an uplink portion of a second frequency band, and to amplify a downlink signal in a downlink portion of the second frequency band. The uplink and downlink signals of the second frequency band form an FDD pair.

In another embodiment, an apparatus comprises a radio frequency signal booster. The radio frequency signal booster comprises a network signal path, an uplink cellular signal path, a downlink cellular signal path, a broadcast television signal path, and a shared antenna. The network signal path is configured to transmit and receive wireless network signals in a first frequency band. The uplink cellular signal path comprises an input and an output and is configured to provide a first cellular signal path gain and to receive uplink signals of a second frequency band. The downlink cellular signal path comprises an input and an output, and is configured to provide a second cellular signal path gain and to receive downlink signals of a third frequency band. The broadcast television signal path comprises an input and an output and is configured to provide a broadcast television signal path gain and to receive broadcast television signals. And the shared antenna is electrically coupled to at least one of the network signal path, the uplink cellular signal path, and the downlink cellular signal path. The apparatus can further comprise a wireless router configured to establish a cellular data connection via the shared antenna, and to provide Wi-Fi connectivity for the cellular data connection via the network signal path. Also, the wireless router can include an external MiFi™ dongle.

In another embodiment a method of operating a radio frequency signal booster comprises the following: receiving a network communication from at least one of an Ethernet or a cellular data input; transmitting the network communication along a wireless network transmission path; receiving a cellular signal; controlling a gain of the cellular signal; transmitting the cellular signal along a cellular transmission path; receiving a broadcast television signal; controlling a gain of the broadcast television signal; and transmitting the broadcast television signal along a broadcast television transmission path. The shared antenna is electrically coupled to at least one of the network transmission path, cellular transmission path, and broadcast television transmission path; and the network communication can be received via a second antenna electrically coupled to the cellular transmission path.

BRIEF DESCRIPTION OF THE DRAWINGS

These drawings and the associated description herein are provided to illustrate specific embodiments of the invention and are not intended to be limiting.

DETAILED DESCRIPTION OF EMBODIMENTS

Figure 1:
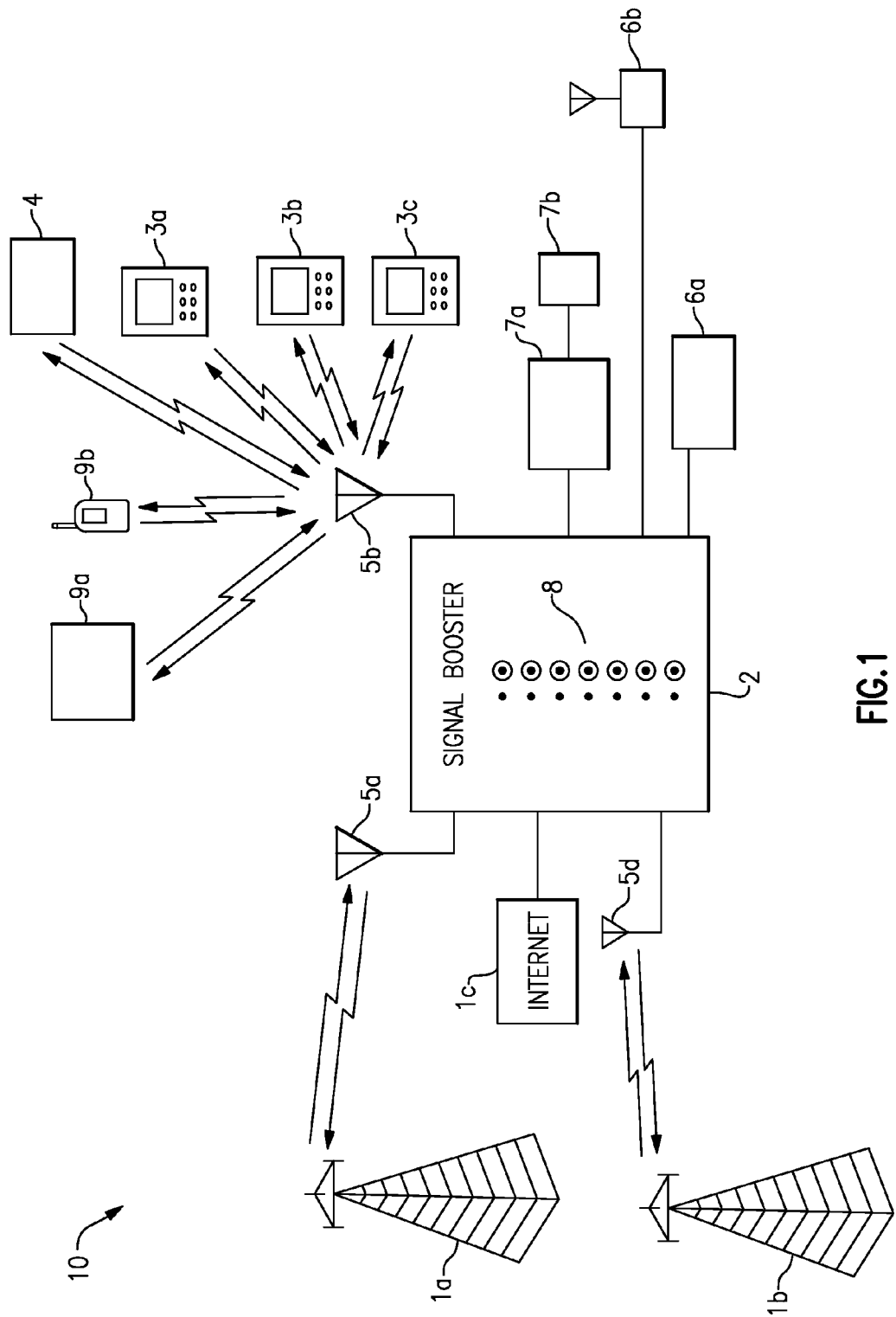
FIG. 1 is a schematic block diagram of one example of a combined television broadcast, Wi-Fi, and mobile network.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

A cellular or mobile network can include base stations for communicating with wireless devices located within the network's cells. For example, the base stations can transmit signals to wireless devices via a downlink channel and can receive signals from the wireless devices via an uplink channel. In the case of a network operating using FDD, the downlink and uplink channels are separate in the frequency domain such that the frequency band operates using a pair of frequency channels. Thereby, FDD allows simultaneous transmission of the downlink and uplink channel pair.

A Wi-Fi network can include both outdoor and indoor access points for communicating with close proximity Wi-Fi enabled devices such as laptops and smartphones. For example, a Wi-Fi access point can transmit signals via a Wi-Fi downlink channel to Wi-Fi enabled devices, such as computers or smartphones, and can receive Wi-Fi signals via a Wi-Fi uplink channel. In the case of a Wi-Fi network operating using TDD, the downlink and uplink channels are separate in the time domain such that downlink traffic signals and uplink traffic signals are allocated different time slots within the same frequency band. Time division duplexing allows asymmetric flow of downlink and uplink traffic by allocating more time to either the downlink flow or to the uplink flow of signal traffic.

Broadcast television transmission refers to the transmission of radio frequency television channels within designated frequency bands by a television transmitter. The transmitted signal is captured by a television antenna, and channels are tuned by a television receiver.

In the case of cellular networks, a wireless device may be unable to communicate with any of the base stations when located in a portion of the mobile network having poor or weak signal strength. For example, the wireless device may be unable to communicate with a particular base station when the wireless device and the base station are separated by a large distance. Additionally, structures such as buildings or mountains can interfere with the transmission and/or reception of signals sent between the wireless device and a base station.

In the case of Wi-Fi networks, a Wi-Fi enabled device may be unable to communicate with a Wi-Fi access point when positioned at a distance outside the Wi-Fi signal range. The Wi-Fi signal range is determined by the access point transmitter location and the strength of the Wi-Fi signal. The Wi-Fi enabled device may not be able to receive the downlink signal if the downlink signal is too weak or if there is physical interference, such as part of a building or wall, between the Wi-Fi enabled devices and the Wi-Fi access point.

In the case of broadcast television, a television receiver may be unable to receive a television broadcast signal when the television broadcast antenna is too far away from the receiver or when there are physical barriers, such as buildings or hillsides, blocking the signal reception.

To improve a Wi-Fi access point, cellular network, broadcast television signal strength, or network signal coverage (range), a separate radio frequency (RF) signal booster or repeater can serve to amplify each signal. For example, the signal booster can serve to amplify or boost signals having frequencies associated with the frequency ranges of the network's uplink and downlink channels. In certain configurations, a signal booster can serve to provide network coverage inside of a structure, such as a home or building. However, other configurations are possible, such as implementations in which the signal booster is used to provide coverage to remote network areas or in which the signal booster is coupled to a vehicle such as an automobile, bus, or train and used to boost network signals as the vehicle's position changes over time. Solutions to improving or boosting Wi-Fi, cellular network, and broadcast television signals are typically implemented and controlled separately. Accordingly, systems for combined boosting of Wi-Fi signals, cellular or mobile signals, and broadcast television signals are desired.

Provided herein are apparatus and methods for radio frequency signal boosters for cell phone, Wi-Fi, and broadcast television signals. A signal booster offering a combined solution of boosting Wi-Fi signals, cellular or mobile signals, and broadcast television signals, is described. A signal booster with the capability of boosting Wi-Fi signals, mobile or cellular signals, and broadcast television signals, can be conveniently located within a house for easy access and control.

The signal boosters described herein can serve to boost multiple frequency bands, thereby improving signal strength for devices using different communications technologies and/or wireless carriers. Configuring the signal booster in this manner can avoid the cost of multiple signal boosters, such as having a specific signal booster for each frequency band. Additionally, the signal boosters can have reduced component count and/or size, since band-pass filters, amplifiers, attenuators and/or other circuitry can be shared for at least two channels. Furthermore, the signal boosters described herein can share power supply circuits, control circuits, a CPU, heat sink, RF shielding, housing, printed circuit board (PCB), antennas, cables, an alternating current (AC) power supply, and similar components. Moreover, it can reduce the cost and difficulty of installation, and can facilitate and avail installation.

The signal boosters described herein can use shared components. For instance, in certain embodiments a signal booster can include a shared antenna. The shared antenna can consolidate different signals having different frequency bands so as to transmit and/or receive the different signals via the shared antenna. In other embodiments a signal booster can also include a shared PCB and a shared power supply.

FIG. 1 is a schematic block diagram of one example of a mobile network 10. The mobile network 10 includes a base station 1a, a television broadcast antenna 1b, a network access provider 1c, a signal booster 2, a plurality of mobile devices 3a-3c (three shown), a network device 4, a plurality of Wi-Fi enabled devices 9a-9b (two shown), a broadcast television receiver 6a, a broadcast television local transmitter 6b, a monitoring unit 7a and a dedicated personal computer (PC) 7b. In addition, the signal booster includes a plurality of signal strength control knobs 8 (7 shown).

The signal booster 2 is electrically coupled to a first antenna 5a, to a second antenna 5b, and to a third antenna 5d.

The signal booster 2 can retransmit signals to and receive signals from the base station 1a using the first antenna 5a, and can retransmit signals to and receive signals from the plurality of mobile devices 3a-3c and/or the network device 4 using the second antenna 5b. For example, the signal booster 2 can retransmit signals to the base station 1 over one or more uplink channels, and can receive signals from the base station 1 over one or more downlink channels. Additionally, the signal booster 2 can retransmit signals to the plurality of mobiles devices 3a-3c and/or the network device 4 over one or more downlink channels, and can receive signals from the devices over one or more uplink channels.

The signal booster 2 can retransmit network data to and receive network data from the network access provider 1c using an internal or external network router or other device such as a Wi-Fi or cellular data modem, and can retransmit signals to and receive signals from the plurality of Wi-Fi enabled devices 9a-9b using the second antenna 5b. In various embodiments, the network access provider 1c can be a cellular data provider (which can be accessed via a separate antenna or another antenna can be shared, for example antennas 5a and 5d). In some embodiments, the network access provider 1c can be a cable or digital subscriber link (DSL) Internet provider (which can be accessed via a wired network cable such as an Ethernet, coaxial, or phone line). In some embodiments, the network access provider 1c can be accessed via an RF cable.

The signal booster 2 can receive signals from the network access provider 1c and retransmit signals from the Wi-Fi enabled devices 9a-9b. The signals can be transmitted using, for example, any Institute of Electrical and Electronics Engineers (IEEE) 802.11 standard (such as, for example, 802.11a, b, g, n, ac, and/or ax) with uplink/downlink signals being duplexed using at least TDD. In certain embodiments the network access provider 1c can be implemented using a router wirelessly connected to the signal booster via Ethernet cable at a port; while in other embodiments the network access provider can be implemented using a Wi-Fi or MiFi™ device.

The signal booster 2 can receive broadcast television signals from the broadcast TV transmitter antenna 1b using the third antenna 5d, and can boost or attenuate the signal for retransmission directly to the broadcast television receiver 6a and/or directly to the broadcast television local transmitter 6b.

The illustrated signal booster 2 includes a personal computer 7b with the monitoring unit 7a to control any aspects of received and transmitted signals including power level and gain. The power level of the received and transmitted signals can be controlled locally or remotely. The monitoring unit 7a may be used in conjunction with the personal computer 7b to control the signals, for example, by electronically adjusting signal path gain/attenuation. Alternatively or additionally, the control knobs 8 can be manually adjusted to control the signals.

In one embodiment, the antennas 5a and 5d can include outdoor antennas positioned external to a structure such as a home or building. The antenna 5b can include an indoor antenna positioned within the structure. However, other configurations are possible. In the illustrated configuration, each of the antennas 5a-5d are external to the signal booster 2, and can be connected, using, for example, cables. However, other configurations are possible, including, for example, configurations in which one or more antennas are integrated as part of a signal booster, configurations in which one or more illustrated antennas are omitted, etc. While illustrated with a common housing for boosting all frequency bands of interest, the teachings herein are applicable to configurations in which the signal booster 2 is implemented in multiples boxes or housings that communicate with one another, such as over a wireless communication channel at different frequency than the frequency bands the signal booster 2 boosts.

Although FIG. 1 illustrates the signal booster 2 as communicating with one cellular base station and one network access provider, and as receiving from one television broadcast antenna, the signal booster 2 can communicate with multiple cellular base stations and multiple network access providers, and can receive from multiple television broadcast antennae. For example, the signal booster 2 can serve to communicate with base stations associated with different cells of a network and different wireless access points, and to receive from television broadcast antennae associated with different TV stations. For instance, one television broadcast antenna can be associated with a TV station transmitting high definition television (HDTV) of one frequency band, and another television broadcast antenna can be associated with a TV station transmitting HDTV of a second frequency band.

Furthermore, in certain implementations, the signal booster 2 can communicate with base stations associated with different networks, including, for example, networks associated with different wireless carriers and/or networks associated with different RF frequencies or bands.

For example, the mobile devices 3a-3c and/or the network device 4 can communicate at least in part over multiple frequency bands, including, for example, cellular Band II, Band IV, Band V, Band XII, Band XIII, and/or a public safety frequency band. For instance, in one example, the first mobile device 3a can operate using Advanced Wireless Services (AWS) (Band IV), the second mobile device 3b can operate using Personal Communication Services (PCS) (Band II), and the third mobile device 3c can operate using Cellular (CLR) services (Band V). Furthermore, in certain configurations, all or a subset of the mobile devices 3a-3c and/or the network device 4 can communicate using Long Term Evolution (LTE), and may transmit and receive Band XII signals, Band XIII signals, and/or signals associated with other LTE bands. Although specific examples of frequency bands and communication technologies have been described above, the teachings herein are applicable to a wide range of frequency bands and communications standards.

Accordingly, the signal booster 2 can be configured to boost signals associated with multiple frequency bands so as to improve network reception for each of the mobile devices 3a-3c and the network device 4. Configuring the signal booster 2 to service multiple frequency bands can improve network signal strength for multiple devices. For example, the signal booster 2 can improve network signal strength of devices using the same or different frequency bands, the same or different wireless carriers, and/or the same or different wireless technologies. Configuring the signal booster 2 as an all-in-one signal booster can avoid the cost of separate signal boosters for each specific frequency band and/or wireless carrier. Additionally, configuring the signal booster 2 as an all-in-one signal booster can also ease and consolidate installation, reduce cabling, and/or issues associated with combining multiple repeaters.

The plurality of mobile devices 3a-3c can represent a wide range of mobile or portable communication devices, including, for example, multi-band mobile phones or interphones. The network device 4 can represent a wide range of other devices configured to communicate over one or more mobile networks, including, for example, computers, televisions, modems, routers, or other electronics. In one embodiment, the network device 4 is another signal booster. Although FIG. 1 illustrates the signal booster 2 as communicating with three mobile devices 3a-3c and one network device 4, the signal booster 2 can serve to communicate with more or fewer mobile devices and/or more or fewer network devices.

Figure 2:
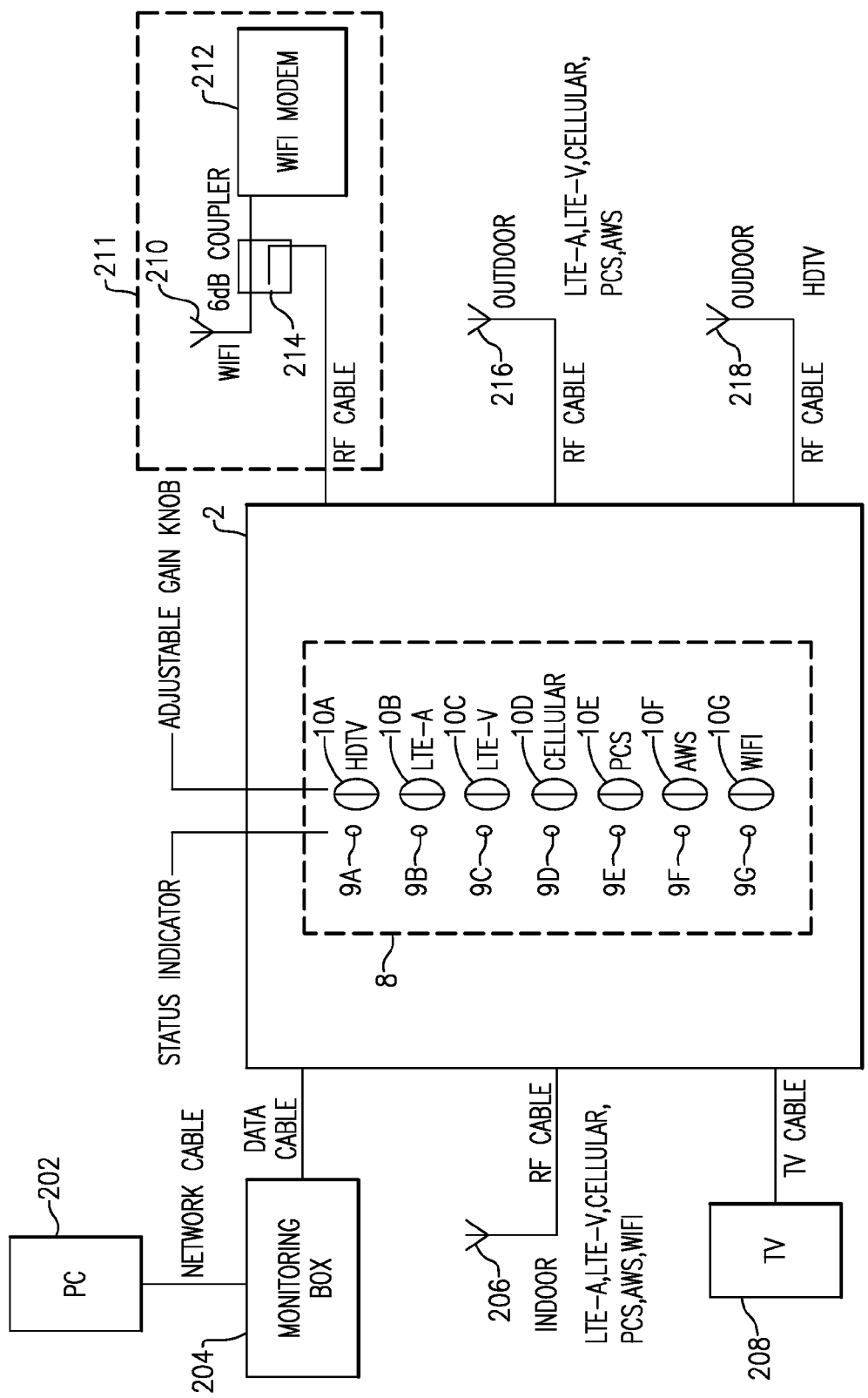
FIG. 2 is a schematic diagram of a radio frequency booster showing external connections according to an embodiment.

FIG. 2 is a schematic diagram of a radio frequency (RF) booster 2 showing external connections according to an embodiment. External components include a PC 202 with a monitoring box 204, an indoor antenna 206, a television (TV) 208, an outdoor HDTV antenna 218, an outdoor antenna 216, and a network access 211. The PC 202 connects to the monitoring box 204 via a network cable, and the monitoring box 204 connects to the RF booster 2 via a data cable. Also, the indoor antenna 206, the outdoor HDTV antenna 218, and the outdoor antenna 216 each connect to the RF booster 2 with an RF cable. The TV 208 connects to the RF booster 2 via a TV cable, and the network access 211 connects to the RF booster 2 via an RF cable or Ethernet cable.

As shown in the embodiment of FIG. 2, the network access 211 has a DSL or cable modem/wireless router 212, a Wi-Fi antenna 210, and an RF coupler 214. The RF coupler 214 can provide a replica of a Wi-Fi signal from the Wi-Fi antenna 210 to the RF booster via an RF cable. The DSL or cable modem/wireless router 212 can be referred to simply as a Wi-Fi modem 212 with the understanding that it can be an DSL or cable modem and a wireless router.

Alternatively, the Wi-Fi modem 212, the Wi-Fi antenna 210, and the RF coupler 214 can be replaced by a wireless router providing a direct link to the RF booster 2 via a cable such as an Ethernet or DSL cable. In the network access 211 the Wi-Fi signal is coupled via an RF cable. In various embodiments, the network access 211 can be integrated into a housing of the booster 2. For example, in some embodiments, the network access 211 can include a wireless router that acts as a mobile Wi-Fi hotspot using a cellular data connection that can be integrated, or partially integrated, into the housing of the booster 2.

The outdoor antenna 216 can also receive signals associated with multiple bands including LTE-A (AT&T LTE Band), LTE-V, Band XII and/or Band XIII), cellular, PCS, AWS bands, and/or public safety frequency band; additionally, the outdoor HDTV antenna 218 can receive broadcast television signals.

The RF booster 2 has a plurality of signal strength control knobs 8 which allow the end user to adjust the gain of a signal and to observe the signal's status. As shown, there are seven adjustable gain knobs 10A-10G with corresponding status indicators 9A-9G. For instance, the gain of broadcast television signals arriving at the outdoor HDTV antenna 218 can be adjusted with the adjustable gain knob 10A so that the retransmitted signal is received by the TV 208; while the status indicator 9A can indicate the presence of an available broadcast television signal.

Similarly, the gain of cellular signals, arriving from outside at the outdoor antenna 216 or from indoors at the indoor antenna 206 can be adjusted with the adjustable gain knobs 10B-10F depending upon the cellular band of the received cellular signal. For instance, gain of a cellular signal of the PCS band, received at either the outdoor antenna 216 or the indoor antenna 206, can be adjusted with the gain knob 10E so that it can be retransmitted at either the indoor antenna 206 or at the outdoor antenna 216, respectively. The status indicator 9E can indicate the presence of the cellular signal of the PCS band or automatic gain control (AGC) has been active, or that an oscillation is happening.

Wi-Fi signals received via the RF coupler 214 can be adjusted with the gain knob 10G to be retransmitted at the indoor antenna 206 or Wi-Fi signals received at the indoor antenna 206 can also be adjusted by the gain knob 10G to be retransmitted to the network access 211. The status indicator 9G can indicate the presence of Wi-Fi signals.

Figure 3:
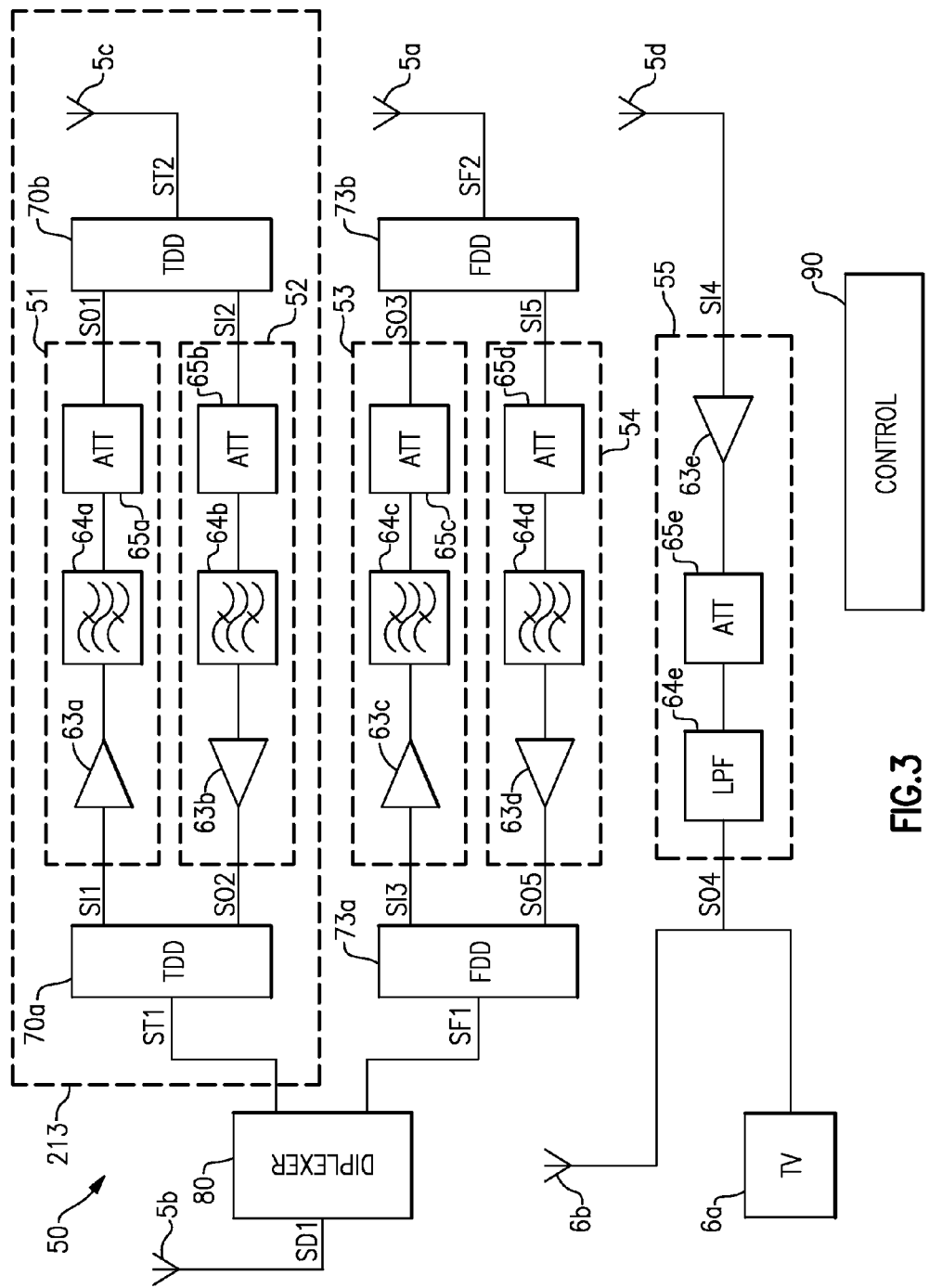
FIG. 3 is a signal path schematic diagram of a signal booster for a time division duplex (TDD) Wi-Fi signal path, a frequency division duplex (FDD) cellular signal path, and a broadcast television signal path according to one embodiment.

FIG. 3 is a signal path schematic diagram of a signal booster 50 for a time division duplex Wi-Fi signal path, a frequency division duplex cellular signal path, and a broadcast television signal path according to one embodiment. The signal booster 50 shows internal and external components of a signal booster including the following: a network path 213, a diplexer 80, a frequency division duplexer 73a, a frequency division duplexer 73b, a mobile uplink signal path 53, a mobile downlink signal path 54, a broadcast television signal path 55, an antenna 5a, an antenna 5b, an antenna 5d, an antenna 6b, a television (TV) 6a, and a control unit 90. The network path 213 includes a time division duplexer 70a, a time division duplexer 70b, an antenna 5c, a Wi-Fi uplink signal path 51, and a Wi-Fi downlink signal path 52. In the following discussion, the mobile uplink/downlink signal paths 53 and 54 can be referred to as signal paths 53 and 54, respectively. Similarly, the broadcast signal path 55 can be referred to as signal path 55; and the Wi-Fi uplink/downlink signal paths 51 and 52 can also be referred to as signal paths 51 and 52, respectively.

As shown in the embodiment of FIG. 3, the Wi-Fi uplink signal path 51 and the downlink signal path 52 are connected between the time division duplexers 70a and 70b. As one of ordinary skill in the art can appreciate, a purpose of the time division duplexers 70a and 70b is to allow the transmission of signals in which the volume of traffic can change drastically from hour to hour. The amount of time allocated for uplink and downlink traffic can be variable; and the ratio of uplink traffic to downlink traffic can be asymmetric.

The Wi-Fi uplink signal path 51 receives an input signal SI1 from the time division duplexer 70a and transmits an output signal SO1 to the time division duplexer 70b. The Wi-Fi uplink signal path 51 can provide signal amplification via an amplifier 63a, filtering via a filter 64a, and attenuation via an attenuator 65a. The amount of attenuation or amplification can be adjusted by a control signal from the control unit 90. Similarly the Wi-Fi downlink signal path 52 receives an input signal SI2 from the time division duplexer 70b and transmits an output signal SO2 to the time division duplexer 70a. The Wi-Fi downlink signal path 52 can provide signal amplification via an amplifier 63b, filtering via a filter 64b and attenuation via an attenuator 65b.

The time division duplexer 70b can transmit or receive a Wi-Fi antenna signal ST2 at the antenna 5c. For instance, when the time division duplexer 70b receives the output signal SO1 from the Wi-Fi uplink signal path 51, the output signal SO1 is transmitted as the Wi-Fi antenna signal ST2 at the antenna 5c. Also, when the antenna 5c receives the Wi-Fi antenna signal ST2 from the outside, the time division duplexer 70b provides the Wi-Fi antenna signal ST2 as the input signal SI2.

Operation of the time division duplexer 70a is similar to that of the time division duplexer 70b. The time division duplexer 70a can transmit or receive a Wi-Fi duplex signal ST1 via connection to the diplexer 80. For instance, when the time division duplexer 70a receives the output signal SO2 from the Wi-Fi downlink signal path 52, the output signal SO2 is transmitted as the Wi-Fi duplex signal ST1. Or when the diplexer 80 provides the Wi-Fi duplex signal ST1 to the time division duplexer 70a, the time division duplexer 70a provides the Wi-Fi duplex signal ST1 as the input signal SI1.

The mobile uplink signal path 53 and the mobile downlink signal path 54 are connected between the frequency division duplexers 73a and 73b. As one of ordinary skill in the art can also appreciate, a purpose of the frequency division duplexers 73a and 73b is to allow simultaneous transmission and reception of uplink and downlink signals having different frequency bands.

The mobile uplink signal path 53 receives an input signal SI3 from the frequency division duplexer 73a and transmits an output signal SO3 to the frequency division duplexer 73b. The mobile uplink signal path 53 can provide signal amplification via an amplifier 63c, filtering via a filter 64c, and attenuation via an attenuator 65c. Similarly the mobile downlink signal path 54 receives an input signal SI5 from the frequency division duplexer 73b and transmits an output signal SO5 to the frequency division duplexer 73a. The mobile downlink signal path 54 can provide signal amplification via an amplifier 63d, filtering via a filter 64d, and attenuation via an attenuator 65d. The amount of attenuation or amplification can be adjusted by a control signal from the control unit 90.

The frequency division duplexer 73b can simultaneously transmit and receive mobile signals at the antenna 5a. For instance, mobile signals of one frequency band can be received by the antenna 5a as signal SF2 and duplexed by the frequency division duplexer 73b as the input signal SI5. Also, the output signal SO3, having a non-overlapping frequency band with that of the input signal SI5, can be transmitted to the antenna 5a as signal SF2.

Operation of the frequency division duplexer 73a is similar to that of the frequency division duplexer 73b. The frequency division duplexer 73a can transmit or receive a mobile signal SF1 via connection to the diplexer 80; and transmission of the output signal SO5 to and reception of the input signal SI3 from the diplexer 80 via signal SF1 can be similar to that of the output signal SO3 to and the input signal SI5 from the antenna 5a.

The diplexer 80 receives and transmits signals ST1 and SF1 from the time division duplexer 70a and the frequency division duplexer 73a, respectively. As one of ordinary skill in the art can appreciate, the diplexer 80 can implement frequency domain multiplexing of the signals ST1 and SF1 to the antenna 5b as signal SD1.

The broadcast television (TV) signal path 55 receives TV input signals SI4 via antenna 5d and transmits TV output signals SO4 to an antenna 6b and/or a TV receiver 6a. The antenna 6b can be an indoor antenna to transmit the TV signals indoors wirelessly. The broadcast television signal path 55 can provide signal amplification via an amplifier 63e, filtering via a filter 64e, and attenuation via an attenuator 65e.

In one embodiment, the gain of each of the signal paths 51-55 can be variable up to about 90 dB. In certain configurations, the gain of one or more of the first to fifth signal paths 51-55 can be externally controlled, such as by using one or more switches and/or by using digital configuration and with AGC. Although one example of gain values has been provided, other configurations are possible.

The attenuators 65a-65e can serve to limit signal path gain of the signal paths 51-55, respectively. For example, it can be desirable to provide attenuation in one or more of the signal paths 51-55, such as in configurations in which one or more of the input signals to the signal paths has a relatively large amplitude, which can occur when the signal booster 50 is positioned relatively close to a base station. In one embodiment, the attenuation of the attenuators 65a-65e can be controlled using one or more processing or control units. For example, one or more embedded CPUs can serve to provide gain control, such as programmable gain control. In certain implementations, the attenuators 65a-65e can be implemented using analog attenuation components. In certain implementations, the attenuation of the attenuators 65a-65e can be controlled using the monitoring unit 7a and the dedicated personal computer (PC) 7b of FIG. 1. However, other configurations are possible, such as implementations using digital attenuators, such as digital step attenuators.

The amplifiers 63a-63e can serve to increase a signal path gain of the signal paths 51-55, respectively. The amplifiers can be low noise amplifiers (LNAs), power amplifiers (Pays), or gain block, or automatic gain control amplifiers (AGCs). In certain implementations a signal path can have more than one amplifier; for instance, a signal path can have both a LNA and a PA.

The filters 64a-6e can serve to filter unwanted frequency components within the signal paths 51-55, respectively. The filters 64a-64e can be band pass filters, high pass filters, low pass filters, or notch filters. In certain implementations a signal path can have more than one filter; for instance, a signal path can have both a low pass filter and a band pass filter. In other implementations a signal path can have more than one band pass filter.

The control circuit 90 can serve to control the operation of the circuitry of the signal booster 50. For example, in certain implementations, the control circuit 90 can serve to control the level of attenuation of the attenuators 65a-65e, to control an amount of amplifier gain of the amplifiers 63a-63e, to control the operation of the time division duplexers 70a-70b, or to provide other control operations in the signal booster 50 such as, for example, time division switching in the time division duplexers 70a and 70b. For clarity of the figures, connections and control signals generated by the control circuit 90 have been omitted. Additionally, although not illustrated in FIG. 3, the signal booster 50 can include additional circuitry such as directional couplers, which can aid the control circuit 90 in controlling output power levels of the signal paths 51-55. Accordingly, in certain implementations the control circuit 90 can operate to provide automatic gain control (AGC). The control circuit 90 can also operate to provide other functionality, including, for example, automatic oscillation detection and/or automatic shutdown to prevent interference with base stations.

Also, even though the illustrated embodiment shows the network path 213 as having Wi-Fi components, other configurations are possible. For instance the network path 213 can include or be a router configured to receive signals from a DSL modem, or from a cable modem, or from a MiFi™ device or any combination of above.

Although various implementations of a signal booster 50 are illustrated in FIG. 3, other configurations are possible. For example, the signal booster can include more or fewer signal paths, frequency division duplexers, time division duplexers, and diplexers. In other implementations, fewer or greater antennae can be used to transmit or receive signals. For instance, the antenna 5b and the antenna 6b can be combined with additional diplexers to form a shared antenna to share the broadcast television signals with the signal SD1. Similarly, on the outdoor side, the antenna a can be combined with the antenna 5d and share the same cabling and connectors using a diplexer. In certain embodiments the antenna 5a and the antenna 5d can be combined with additional diplexers to form a shared antenna to share the broadcast television signals with the signal SF2. Additionally, one or more of the signal paths can be modified to include more or fewer components and/or a different arrangement of components. For example, in certain implementations, the position of a filter and an attenuator can be reversed in a cascade, the filters can be positioned before the amplifiers in one or more of the cascades, and/or additional components can be inserted in the cascade. In certain implementations, signal paths can include amplifiers placed in parallel, and signal paths can include detectors to measure signal strength.

Figure 4A:
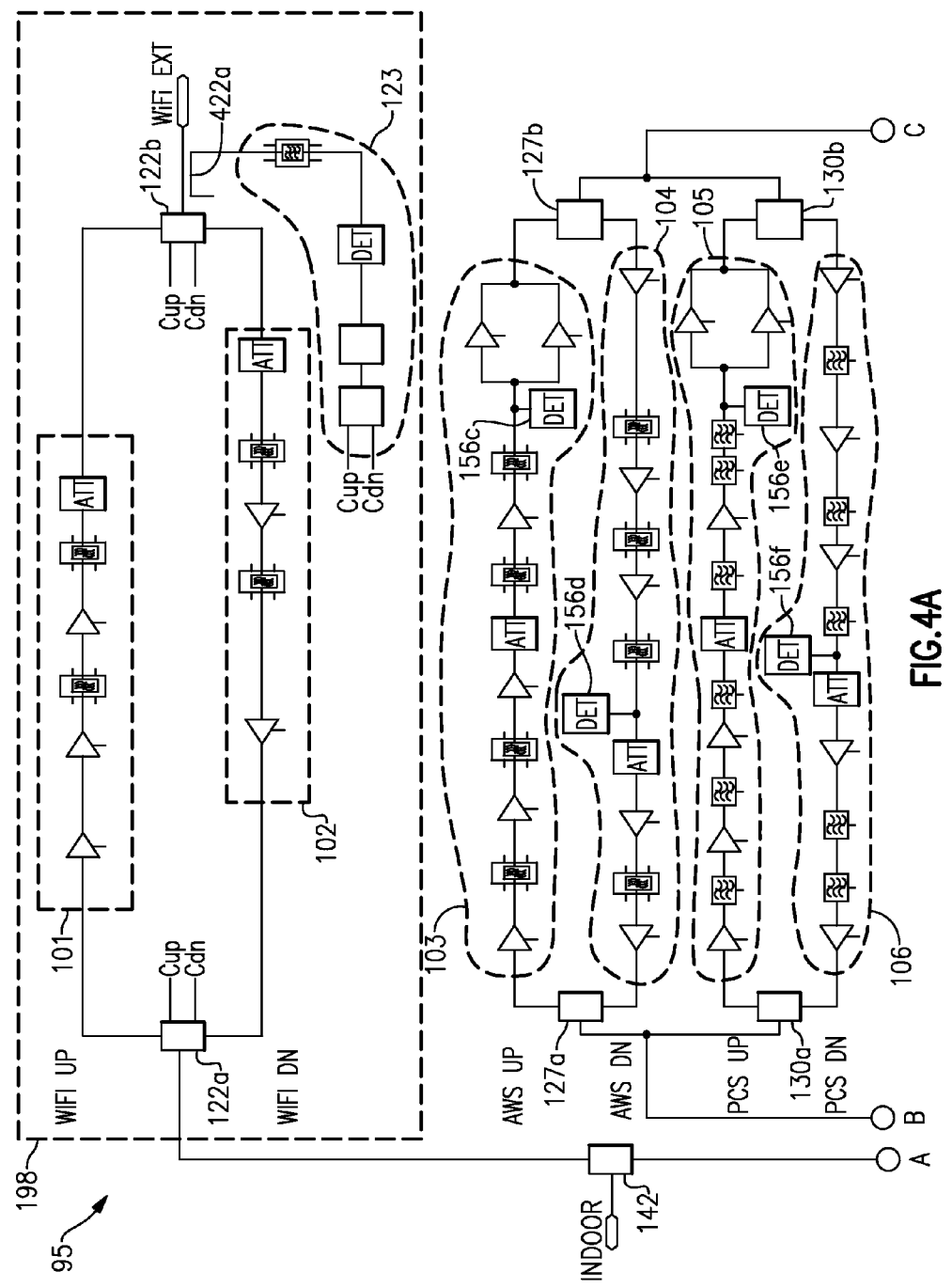
FIG. 4A is a schematic diagram of a first part of a signal booster for uplink and downlink channels for multiple signal paths according to one embodiment.

FIG. 4A is a schematic diagram of a first part 95 of a signal booster for uplink and downlink channels for multiple signal paths according to one embodiment. The first part 95 of the signal booster includes a first signal path 101, a second signal path 102, a third signal path 103, a fourth signal path 104, a fifth signal path 105, and a sixth signal path 106. In various embodiments, the first signal path 101 can correspond to the signal path 51 of FIG. 3. The second signal path 102 can correspond to the signal path 52 of FIG. 3. Any of the third through sixth signal paths 103-106 can correspond to one of the signal paths 53-54 of FIG. 3. The first part 95 of the signal booster further includes a first time division duplexer 122a, a second time division duplexer 122b, a first frequency division duplexer 127a, a second frequency division duplexer 127b, a third frequency division duplexer 130a, a fourth frequency division duplexer 130b, and a first diplexer 142.

The first time division duplexer 122a includes a first terminal electrically connected to a first signal path input of the first signal path 101, a second terminal electrically connected to a second signal path output of the second signal path 102, and a third terminal electrically connected to a first terminal of the first diplexer 142. The second time division duplexer 122b includes a first terminal electrically connected to a first signal path output of the first signal path 101, a second terminal electrically connected to a second signal path input of the second signal path 102, and a third terminal. A time division control circuit 123 includes an up control logic port Cup and a down control logic port Cdn each electrically connected to the first and second time division duplexers 122a, 122b.

The first frequency division duplexer 127a includes a first terminal electrically connected to a third signal path input of the third signal path 103, a second terminal electrically connected to a fourth signal path output of the fourth signal path 104, and a third terminal. The second frequency division duplexer 127b includes a first terminal electrically connected to a third signal path output of the third signal path 103, a second terminal electrically connected to a fourth signal path input of the fourth signal path 104, and a third terminal. The third frequency division duplexer 130a includes a first terminal electrically connected to a fifth signal path input of the fifth signal path 105, a second terminal electrically connected to a sixth signal path output of the sixth signal path 106, and a third terminal. The fourth frequency division duplexer 130b includes a first terminal electrically connected to a fifth signal path output of the fifth signal path 105, a second terminal electrically connected to a sixth signal path input of the sixth signal path 106, and a third terminal.

The first to sixth signal paths 101-106 further include different circuit connection methodologies such as parallel connected amplifiers and include additional sensing elements such as signal power detectors.

In FIG. 4A the first signal path 101 can receive a Wi-Fi uplink channel signal, the second signal path 102 can receive a Wi-Fi downlink channel signal, the third signal path 103 can receive a mobile AWS uplink channel signal, the fourth signal path 104 can receive a mobile AWS downlink channel signal, the fifth signal path 105 can receive a mobile PCS uplink channel signal, and the sixth signal path 106 can receive a mobile PCS downlink channel signal. The third terminal of the second time division duplexer 122b can be electrically connected to a Wi-Fi receiver antenna, and the third terminal of the first diplexer 142 can be electrically connected to an RF local transceiver antenna, where the RF local transceiver antenna can be a shared antenna. In certain implementations the first part 95 of the signal booster can be a first printed circuit board.

Also as shown in FIG. 4A, the first signal path 101, the second signal path 102, the first time division duplexer 122a, the second time division duplexer 122b, a Wi-Fi control section 123, and a coupler 422a are delineated as a network unit 198. In the network unit 198, the Wi-Fi control section 123 can provide uplink and downlink control of Wi-Fi signals and can receive control via connections to control signal ports Cdn and Cup.

Figure 4B:
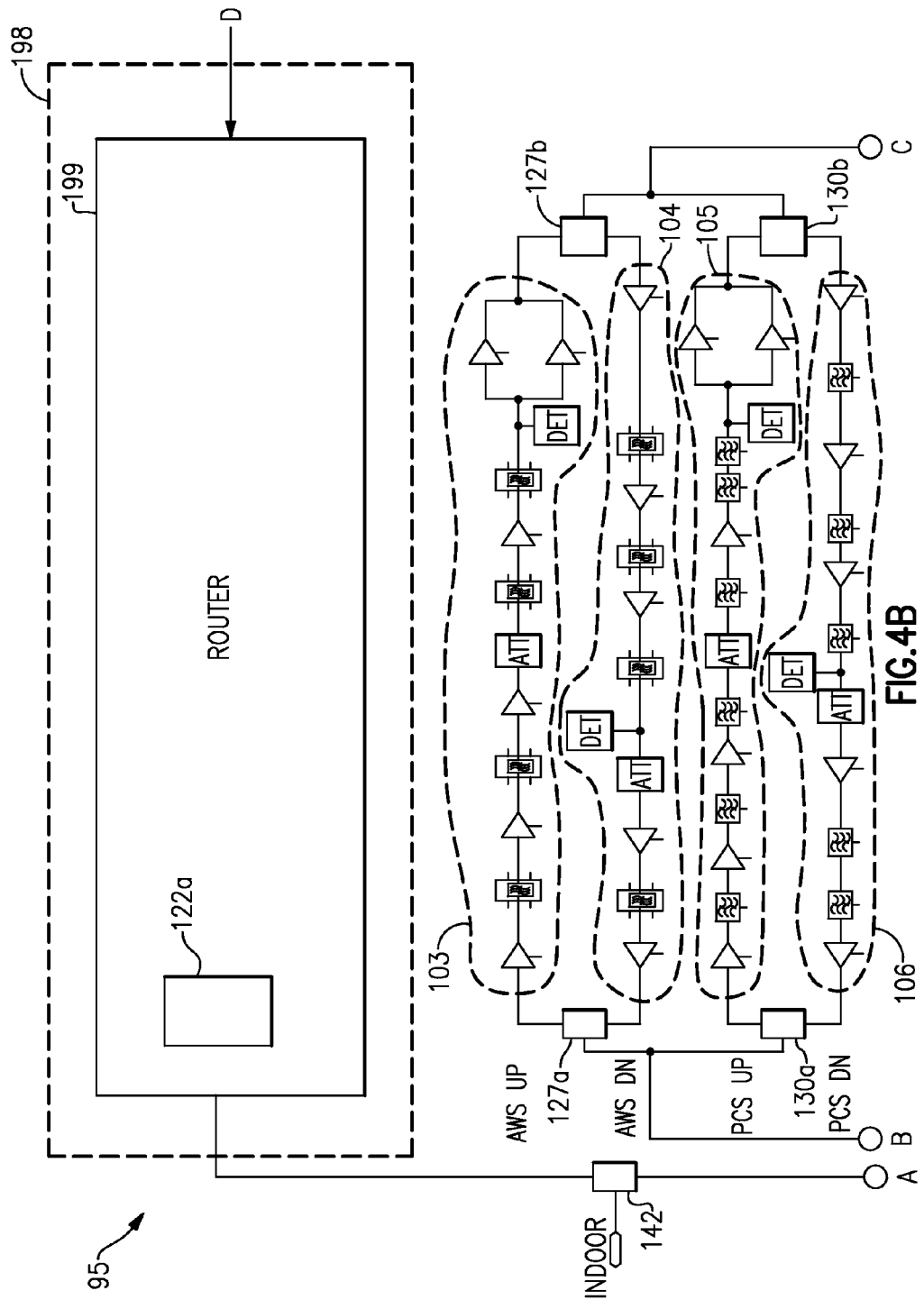
FIG. 4B is a schematic diagram of a first part of a signal booster for uplink and downlink channels for multiple signal paths according to another embodiment.

In certain configurations fewer or greater time division duplexers can be used. In other configurations a time division duplexer can include additional RF components including a switch and/or a circulator. FIG. 4B is also schematic diagram of a first part 95 of a signal booster for uplink and downlink channels for multiple signal paths according to another embodiment. The first part 95 of FIG. 4B is similar to the first part 95 of FIG. 4A except network unit 198 of FIG. 4B is different. As shown in FIG. 4B, the network unit 198 has a router 199. The router 199 receives a network signal D and is connected directly to the diplexer 142 to transmit and receive network signals from indoors. The router 199 can be a Wi-Fi router or a MiFi™. MiFi™ is a brand name used to describe a wireless router that acts as mobile Wi-Fi hotspot, for example using a cellular data connection. MiFi™ can have an internal modem or can have an external 4G dongle modem. The network signal D can be connected by means of a network cable such as an Ethernet cable. In some embodiments, the network signal D can include a cellular data connection via a separate antenna, or received via the external antenna (for example, received from the third diplexer 139b). In certain embodiments when the DSL modem is integrated inside the signal booster, then the network signal D can be connected by an DSL cable. In certain embodiments the router 199 can be a 3G/4G router allowing connection through long term evolution (LTE) or similar commercial services.

Figure 4C:
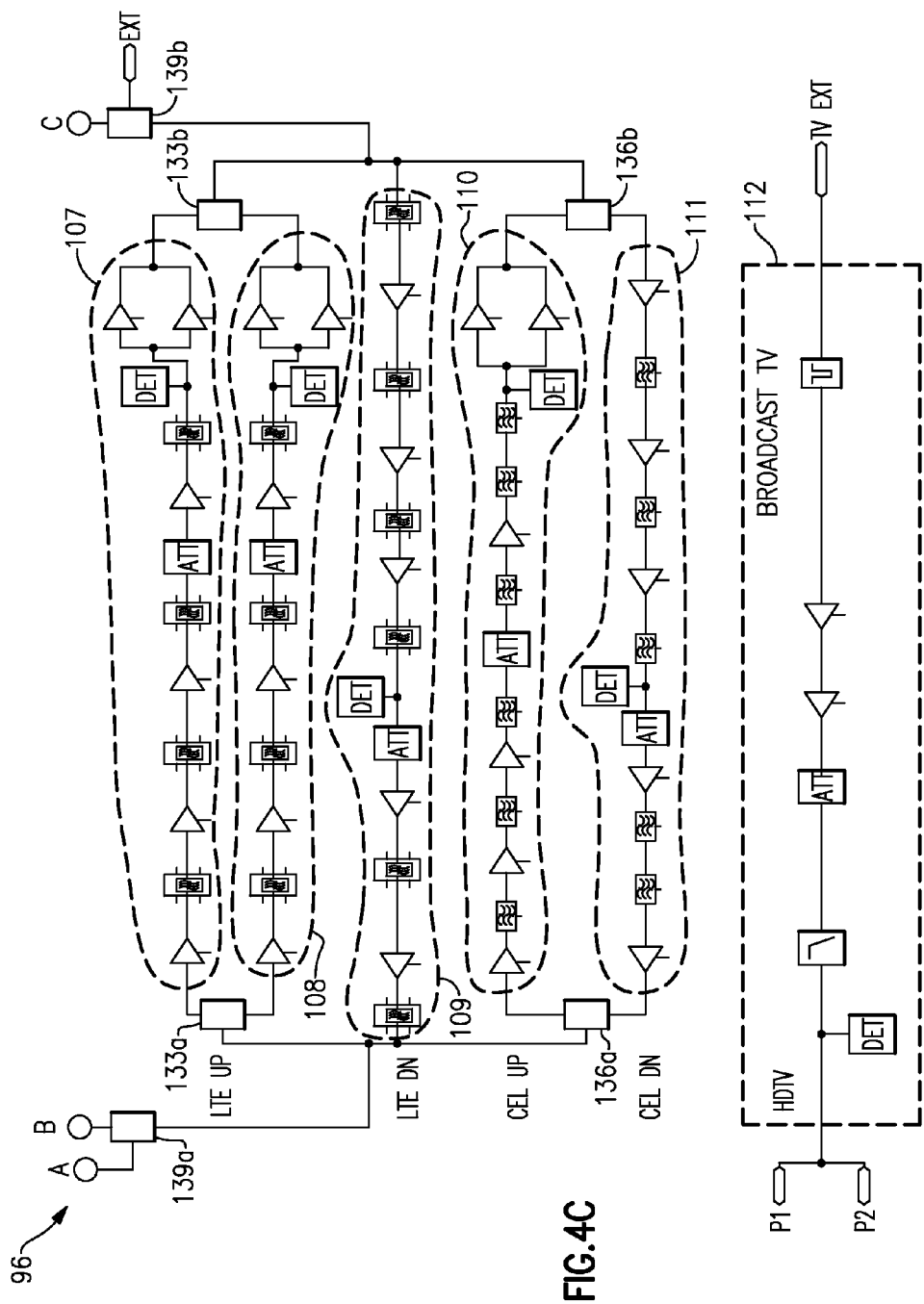
FIG. 4C is a schematic diagram of a second part of the signal booster of FIGS. 4A and 4B according to one embodiment.

FIG. 4C is a schematic diagram a second part 96 of the signal booster for uplink and downlink channels for multiple signal paths according to one embodiment. The second part 96 of the signal booster includes a seventh signal path 107, an eighth signal path 108, a ninth signal path 109, a tenth signal path 110, an eleventh signal path 111, and a twelfth signal path 112. In various embodiments, any of the seventh through eleventh signal paths 107-111 can correspond to one of the signal paths 53-54 of FIG. 3. The twelfth signal path 112 can correspond to the signal path 55 of FIG. 3. The second part 96 of the signal booster further includes a fifth frequency division duplexer 133a, a sixth frequency division duplexer 133b, a seventh frequency division duplexer 136a, an eighth frequency division duplexer 136b, a second diplexer 139a, and a third diplexer 139b.

The fifth frequency division duplexer 133a includes a first terminal electrically connected to a seventh signal path input of the seventh signal path 107, a second terminal electrically connected to an eight signal path input of the eighth signal path, and a third terminal. The sixth frequency division duplexer 133b includes a first terminal electrically connected to a seventh signal path output of the seventh signal path, a second terminal electrically connected to an eighth signal path output of the eighth signal path, and a third terminal.

The seventh frequency division duplexer 136a includes a first terminal electrically connected to a tenth signal path input of the tenth signal path 110, a second terminal electrically connected to an eleventh signal path output of the eleventh signal path 111, and a third terminal. The eighth frequency division duplexer 136b includes a first terminal electrically connected to a tenth signal path output of the tenth signal path 110, a second terminal electrically connected to an eleventh signal path input of the eleventh signal path 111, and a third terminal.

As shown in both FIGS. 4A and 4B, the second diplexer 139a includes a first terminal electrically connected to the third terminal of the first frequency division duplexer 127a and to the third terminal of the third frequency division duplexer 130a via connection B. The second diplexer 139a further includes a third terminal electrically connected to a second terminal of the first diplexer 142 via connection A. The second diplexer additionally includes a second terminal electrically connected to the third terminal of the fifth frequency division duplexer 133a, to a ninth signal path output of the ninth signal path 109, and to the third terminal of the seventh frequency division duplexer 136a. The second diplexer 139a additionally includes a third terminal. The third diplexer 139b includes a first terminal electrically connected to the third terminal of the second frequency division duplexer 127b and to the third terminal of the fourth frequency division duplexer 130b via connection C. The third diplexer 139b further includes a second terminal electrically connected to the third terminal of the sixth frequency division duplexer 133b, to a ninth signal path input of the ninth signal path 109, and to the third terminal of the eighth frequency division duplexer 136b. The third diplexer 139b additionally includes a third terminal.

The seventh to twelfth signal paths 107-112 include different combinations of components, such as amplifiers, attenuators, and filters, selected to achieve an overall signal path gain characteristic desirable for a particular band. Also, the seventh to twelfth signal paths 107-112 further include different circuit connection methodologies such as parallel connected amplifiers and include additional sensing elements such as signal power detectors.

In one embodiment of FIG. 4C the seventh signal path 107 can receive a first mobile LTE uplink channel signal, the eighth signal path 108 can receive a second mobile LTE uplink signal, the ninth signal path 109 can receive a mobile LTE downlink channel signal, the tenth signal path 110 can receive a mobile cellular uplink signal, the eleventh signal path 111 can receive a mobile cellular downlink channel signal, and the twelfth signal path 112 can receive a broadcast television channel signal. In certain embodiments the twelfth signal path 112 can receive HDTV signals. Additionally, the third terminal of the third diplexer 139b can be electrically connected to an RF antenna. The second part 96 of the signal booster can be a second printed circuit board.

In certain embodiments the shared antenna can share the Wi-Fi, AWS, PCS, LTE, cellular and/or public safety signals. In other embodiments the HDTV signals can be diplexed with the shared antenna so that the shared antenna further includes HDTV or broadcast TV signals. In certain embodiments WiFi signals can also be transmitted to outdoors and even share an outdoor antenna for cellular signals through a diplexer.

In certain embodiments the first part 95 of the signal booster of FIG. 4A or FIG. 4B can include a first printed circuit board configured to receive signals of a frequency greater than or equal to a threshold frequency; and the second part 96 of the signal booster 98 of FIG. 4C can include a second printed circuit board configured to receive signals of a frequency less than the threshold frequency. For example, in various embodiments, the threshold frequency can be an upper or lower bound of any of the Bands I-XIII discussed herein. In other embodiments the first part 95 and the second part 96 of the signal booster include only one printed circuit board.

Although FIGS. 4A-4C illustrate one example of a signal booster in accordance with the teachings herein, other configurations are possible. For example, the teachings herein are applicable to configurations in which the signal booster boosts more or fewer bands or a different combination of bands.

Figure 5A:
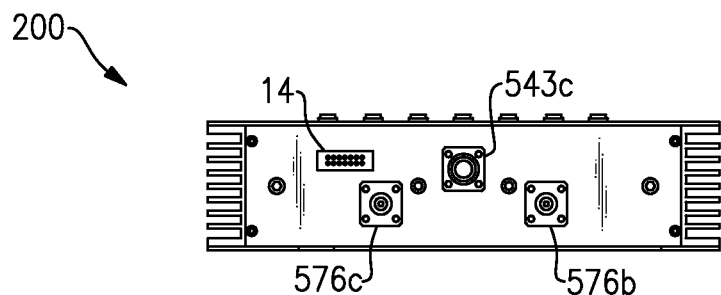
FIGS. 5A-5C illustrate front, top and rear elevational views of a signal booster according to one embodiment.
Figure 5B:
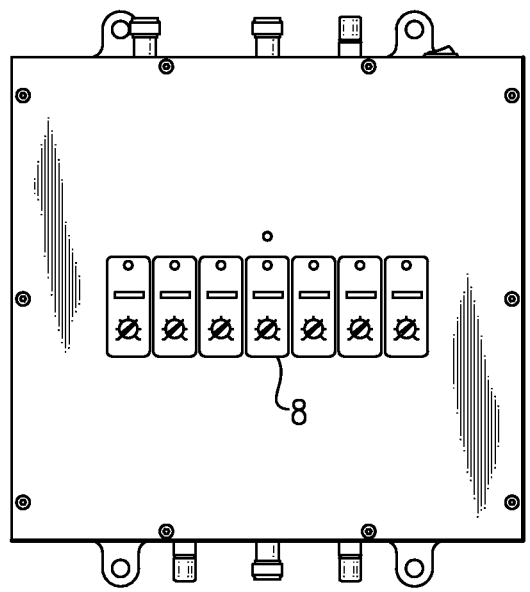
Figure 5C:
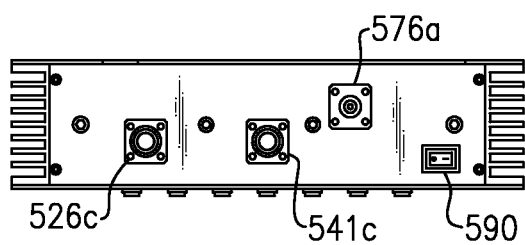

The public safety frequency bands include a 700 Megahertz public safety frequency band, and/or a 800 Megahertz public safety frequency band, and/or a 900 Megahertz public safety frequency band in the U.S. FIGS. 5A-5C illustrates various views of a signal booster 200 according to one embodiment. In various embodiments, the signal booster 200 can correspond with any of the signal boosters discussed herein, such as the signal booster 2 of FIG. 1, the signal booster within the signal booster 50 of FIG. 3, and the signal booster of FIGS. 4A-4C. The signal booster 200 includes a plurality of signal strength control knobs 8, an serial port 14, a first broadcast television signal input connector 576a, a first broadcast television signal output connector 576b, a second broadcast television output connector 576c, a first Wi-Fi signal input connector 526c, a first mobile or cellular signal input connector 541c, a first RF signal connector 543c, and an on/off switch 590.

With reference to FIG. 1, in certain embodiments the serial port 14 can be electrically connected to the monitoring unit 7a and the PC 7b. The first broadcast television signal input connector 576a can be electrically connected to the third antenna 5d; the first and second broadcast television output connectors 576b, 576c can be connected to the broadcast television receiver 6a and/or to the broadcast television local transmitter 6b, respectively. The first mobile or cellular signal input connector 541c can be connected to the first antenna 5a. The first RF signal connector 543c can be connected to the second antenna 5b.

Applications

Some of the embodiments described above have provided examples in connection with radio frequency signal boosters. However, the principles and advantages of the embodiments can be used in other suitable systems or apparatus.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency signal booster comprising:
    a time division duplex (TDD) circuit configured to amplify, pass, or process an uplink signal in a first frequency band, and to amplify or pass or process a downlink signal in the first frequency band, the uplink and downlink signals of the first frequency band forming a TDD pair;
    a frequency division duplex (FDD) circuit configured to amplify, simultaneously with the TDD circuit, an uplink signal in an uplink portion of a second frequency band, and to amplify a downlink signal in a downlink portion of the second frequency band, the uplink and downlink signals of the second frequency band forming a FDD pair; and
    a wireless router configured to establish a cellular data connection via an antenna, and to provide Wi-Fi connectivity for the cellular data connection via the TDD circuit,
    wherein the antenna is configured to be electrically coupled to both a cellular data portion of the wireless router and a downlink input of the FDD circuit, and a second antenna is configured to be electrically coupled to both a Wi-Fi portion of the wireless router and an downlink output of the FDD circuit.

2. The radio frequency signal booster of claim 1, wherein the wireless router is configured to establish a wired data connection via an Ethernet port, and to provide Wi-Fi connectivity for the wired data connection via the TDD circuit.

3. The radio frequency signal booster of claim 1, further comprising a shared antenna electrically coupled to at least one of the TDD circuit and the FDD circuit.

4. The radio frequency signal booster of claim 1, wherein at least one external radio frequency cable electrically coupled to both the TDD circuit and the FDD circuit.

5. The radio frequency signal booster of claim 1, wherein at least one of the following are shared by both the TDD circuit and the FDD circuit: a direct current power supply, an alternating current power supply, a housing, a printed circuit board, one or more diplexers, one or more radio frequency connectors, a control circuit or processor, radio frequency shielding, internal radio frequency cabling, an amplifier, a duplexer, a multiplexer or radio frequency signal path, and a heat sink.

6. The radio frequency signal booster of claim 1, wherein the first frequency band comprises a wireless networking band, and the second frequency band comprises a cellular communications band.

7. The radio frequency signal booster of claim 1, wherein the second frequency band comprises a public safety frequency band.

8. The radio frequency signal booster of claim 1, further comprising:
    a plurality of control knobs configured to provide manual gain control of signals of at least one of the first and second frequency bands;
    a monitoring box configured to provide local and remote gain control, automatic gain control, or shut down control of signals of at least one of the first and second frequency bands.

9. The radio frequency signal booster of claim 1, further comprising
    an amplifier path configured to amplify, pass, or process a broadcast television band signal in a first frequency band.

10. An apparatus comprising a radio frequency signal booster, wherein the radio frequency signal booster comprises:
    a network signal path circuit configured to transmit and receive wireless network signals in a first frequency band, wherein the first frequency band comprises a Wi-Fi frequency band and wherein the network signal path circuit comprises:
        an uplink Wi-Fi signal path circuit comprising an input and an output, wherein the uplink Wi-Fi signal path circuit is configured to provide a Wi-Fi signal path circuit gain and to receive time division duplexed (TDD) uplink signals; and
        a downlink Wi-Fi signal path circuit comprising an input and an output, wherein the downlink Wi-Fi signal path circuit is configured to provide a Wi-Fi signal path circuit gain and to receive time division duplexed (TDD) downlink signals;
    an uplink cellular signal path circuit comprising an input and an output, wherein the uplink cellular signal path circuit is configured to provide a first cellular signal path circuit gain and to receive uplink signals of a second frequency band;
    a downlink cellular signal path circuit comprising an input and an output, wherein the downlink cellular signal path circuit is configured to provide a second cellular signal path circuit gain and to receive downlink signals of the second frequency band;

a broadcast television signal path circuit comprising an input and an output, wherein the broadcast television signal path circuit is configured to provide a broadcast television signal path circuit gain and to receive broadcast television signals; and a shared antenna electrically coupled to at least one of the network signal path circuit, the uplink cellular signal path circuit, and the downlink cellular signal path circuit.

11. The apparatus of claim 10, further comprising a wireless router configured to establish a cellular data connection via the shared antenna, and to provide Wi-Fi connectivity for the cellular data connection via the network signal path circuit.

12. The apparatus of claim 11, wherein the wireless router includes an external MiFi™ dongle.

13. The apparatus of claim 10, wherein at least one of the uplink Wi-Fi signal path circuit, the downlink Wi-Fi signal path circuit, the uplink cellular signal path circuit, the downlink cellular signal path circuit, and the broadcast television signal path circuit comprises at least one amplifier, at least one attenuator, and at least one filter.

14. The apparatus of claim 10, wherein the network signal path circuit translates a digital subscriber line (DSL) signal or cable modem signal into a Wi-Fi signal.

15. The apparatus of claim 10, further comprising:
a first time division duplexer wherein the input of the uplink Wi-Fi signal path circuit connects to a first terminal of the first time division duplexer and wherein the output of the downlink Wi-Fi signal path circuit connects to a second terminal of the first time division duplexer; and
a second time division duplexer wherein the input of the downlink Wi-Fi signal path circuit connects to a first terminal of the second time division duplexer, wherein the output of the uplink Wi-Fi signal path circuit connects to a second terminal of the second time division duplexer, and wherein a Wi-Fi receiver antenna connects to a third terminal of the second time division duplexer.

16. The apparatus of claim 15,
wherein the first time division duplexer and the second time division duplexer each is configured to receive a control signal from a control circuit; and
wherein the first time division duplexer and the second time division duplexer each comprise a switch and/or a circulator.

17. The apparatus of claim 10, wherein the second frequency band comprises a first mobile telecommunications frequency band.

18. An apparatus comprising a radio frequency signal booster, wherein the radio frequency signal booster comprises:
a network signal path circuit configured to transmit and receive wireless network signals in a first frequency band;
an uplink cellular signal path circuit comprising an input and an output, wherein the uplink cellular signal path circuit is configured to provide a first cellular signal path circuit gain and to receive uplink signals of a second frequency band;
a downlink cellular signal path circuit comprising an input and an output, wherein the downlink cellular signal path circuit is configured to provide a second cellular signal path circuit gain and to receive downlink signals of the second frequency band;

a broadcast television signal path circuit comprising an input and an output, wherein the broadcast television signal path circuit is configured to provide a broadcast television signal path circuit gain and to receive broadcast television signals;

a shared antenna electrically coupled to at least one of the network signal path circuit, the uplink cellular signal path circuit, and the downlink cellular signal path circuit;

a first frequency division duplexer wherein the input of the uplink cellular signal path circuit connects to a first terminal of the first frequency division duplexer, and wherein the output of the downlink cellular signal path circuit connects to a second terminal of the first frequency division duplexer; and a second frequency division duplexer wherein the input of the downlink cellular signal path circuit connects to a first terminal of the second frequency division duplexer, and wherein the output of the uplink cellular signal path circuit connects to a second terminal of the second frequency division duplexer.

19. The apparatus of claim 18, wherein a third terminal of the second frequency division duplexer connects to a first radio frequency antenna.

20. The apparatus of claim 18, further comprising a first diplexer wherein a third terminal of the first time division duplexer connects to a first terminal of the first diplexer, and wherein a third terminal of the first frequency division duplexer connects to a second terminal of the first diplexer.

21. The apparatus of claim 20 further configured to multiplex uplink signals of the first frequency band, downlink signals of the first frequency band, uplink signals of the second frequency band, and downlink signals of the second frequency band to a third terminal of the first diplexer.

22. The apparatus of claim 21, wherein a third terminal of the first diplexer connects to a second radio frequency antenna.

23. The apparatus of claim 10, wherein the input of the broadcast television signal path circuit connects to a television receiver antenna, and the broadcast television signal path circuit comprises at least one television output port which connects to a broadcast television device.

24. The apparatus of claim 23, wherein the at least one television output port connects to an input of a radio frequency transmitter.

25. The apparatus of claim 10, further comprising a control circuit configured to vary a gain of at least one of the network signal path circuit, the uplink cellular signal path circuit, the downlink cellular signal path circuit, and the broadcast television signal path.

26. A method of operating a radio frequency signal booster, the method comprising:
receiving, at the radio frequency signal booster, a network communication from at least one of an Ethernet or a cellular data input;
transmitting the network communication along a wireless network transmission path circuit in a first frequency band, wherein the first frequency band comprises a Wi-Fi frequency band and wherein the wireless network transmission path circuit comprises:
an uplink Wi-Fi signal path circuit comprising an input and an output, wherein the uplink Wi-Fi signal path circuit is configured to provide a Wi-Fi signal path circuit gain and to receive time division duplexed (TDD) uplink signals; and a downlink Wi-Fi signal path circuit comprising an input and an output, wherein the downlink Wi-Fi signal path circuit is configured to provide a Wi-Fi signal path circuit gain and to receive time division duplexed (TDD) downlink signals;

receiving a cellular signal;
controlling, via at least one amplifier, a gain of the cellular signal;
transmitting the cellular signal along a cellular transmission path;
receiving a broadcast television signal;
controlling a gain of the broadcast television signal; and
transmitting the broadcast television signal along a broadcast television transmission path,
wherein a shared antenna is electrically coupled to at least one of the network transmission path, cellular transmission path, and broadcast television transmission path.

* * * * *